United States Patent
Zhang et al.

(10) Patent No.: US 12,112,486 B2
(45) Date of Patent: Oct. 8, 2024

(54) METHOD AND SYSTEM FOR OPTIMIZING OPTICAL FLOW FOR IMAGES BASED ON RESIDUAL FIELD AND DISPLACEMENT FIELD

(71) Applicant: NANCHANG HANGKONG UNIVERSITY, Jiangxi (CN)

(72) Inventors: Congxuan Zhang, Nanchang (CN); Cheng Feng, Nanchang (CN); Zhen Chen, Nanchang (CN); Weiming Hu, Nanchang (CN); Ming Li, Nanchang (CN); Hao Chen, Nanchang (CN)

(73) Assignee: NANCHANG HANGKONG UNIVERSITY, Nanchang (CN)

( * ) Notice: Subject to any disclaimer, the term of this patent is extended or adjusted under 35 U.S.C. 154(b) by 533 days.

(21) Appl. No.: 17/570,836

(22) Filed: Jan. 7, 2022

(65) Prior Publication Data

US 2022/0222833 A1   Jul. 14, 2022

(30) Foreign Application Priority Data

Jan. 8, 2021   (CN) .......................... 202110022829.1

(51) Int. Cl.
    *G06T 7/246*   (2017.01)

(52) U.S. Cl.
    CPC .... *G06T 7/248* (2017.01); *G06T 2207/10016* (2013.01); *G06T 2207/20016* (2013.01)

(58) Field of Classification Search
    CPC . G06T 2207/10016; G06T 2207/20081; G06T 7/269; G06T 7/33; G06T 7/248; G06T 2207/20016
    See application file for complete search history.

(56) References Cited

U.S. PATENT DOCUMENTS

| 2016/0307321 | A1* | 10/2016 | Moon | G06T 7/207 |
| 2019/0124337 | A1* | 4/2019 | Ruefenacht | H04N 19/56 |
| 2022/0101539 | A1* | 3/2022 | Lin | G06T 7/215 |

FOREIGN PATENT DOCUMENTS

| CN | 105261042 A | * | 1/2016 | |
| CN | 105787901 A | * | 7/2016 | G06T 5/002 |
| CN | 108881899 A | * | 11/2018 | G06T 5/007 |
| CN | 110751672 A | * | 2/2020 | G06T 7/207 |
| CN | 111340844 A | * | 6/2020 | G06T 7/246 |

* cited by examiner

*Primary Examiner* — Dung Hong
(74) *Attorney, Agent, or Firm* — Bochner PLLC; Andrew D. Bochner

(57) ABSTRACT

A method and system for optimizing optical flow for images based on a residual field and a displacement field are provided. The method includes: obtaining reference images; estimating an initial optical flow field from the reference images by using an optical flow estimation method; obtaining an optical flow optimization model, where the optical flow optimization model includes an image encoder, an optical flow encoder, a first decoder, and a sub-decoder; inputting any image of the reference images and the initial optical flow field into the optical flow optimization model to output the residual field and the displacement field; superimposing the initial optical flow field and the residual field to obtain a preliminarily optimized optical flow field; and resampling the preliminarily optimized optical flow field by using the displacement field to obtain an optimized optical flow field.

8 Claims, 4 Drawing Sheets

METHOD AND SYSTEM FOR OPTIMIZING OPTICAL FLOW FOR IMAGES BASED ON RESIDUAL FIELD AND DISPLACEMENT FIELD

CROSS REFERENCE TO RELATED APPLICATION(S)

This patent application claims the benefit and priority of Chinese Patent Application No. 202110022829.1 filed on Jan. 8, 2021, the disclosure of which is incorporated by reference herein in its entirety as part of the present application.

TECHNICAL FIELD

The present disclosure relates to a field of optical flow calculation for an image sequence, and in particular to a method and system for optimizing optical flow for images based on a residual field and a displacement field.

BACKGROUND ART

An optical flow refers to a two-dimensional instantaneous velocity of a surface pixel of a moving object or scene on a projection plane. The optical flow may provide information about motion parameters of the moving object and the scene in an image, and provide rich three-dimensional structure information. The optical flow is a hot issue in a field such as image processing or computer vision. In recent years, with rapid development of a deep learning theory and technology, a convolutional neural network model is widely used in research on an optical flow estimation technology. Due to significant advantages such as a fast calculation speed and high stability, this technology gradually becomes a hot topic in a research field of occlusion detection. A research result is widely used in higher-level vision tasks such as action recognition, human gesture recognition, optical flow estimation, face recognition, target tracking, and three-dimensional reconstruction.

At present, the optical flow estimation technology based on a convolutional neural network is the most commonly used in optical flow calculation technologies for an image sequence. This technology usually results in an excessive smoothing phenomenon in a motion boundary region of an object, and results in a more serious edge blurring phenomenon for the image sequence including non-rigid motion and large displacement, which limits application of this technology in various fields.

SUMMARY

An objective of the present disclosure is to provide a method and system for optimizing optical flow for images based on a residual field and a displacement field, to improve accuracy and robustness of optical flow estimation for an image sequence in a motion boundary region.

To achieve the above objective, the present disclosure provides the following solution:

A method for optimizing optical flow for images based on the residual field and the displacement field includes:
  obtaining reference images, the reference images are two adjacent images in an image sequence;
  estimating an initial optical flow field from the reference images by using an optical flow estimation method;
  obtaining an optical flow optimization model, where the optical flow optimization model includes an image encoder, an optical flow encoder, a first decoder, and a sub-decoder;
  inputting any image of the reference images and the initial optical flow field into the optical flow optimization model to output the residual field and the displacement field;
  superimposing the initial optical flow field and the residual field to obtain a preliminarily optimized optical flow field; and
  resampling the preliminarily optimized optical flow field by using the displacement field to obtain an optimized optical flow field.

In an embodiment, the image encoder includes a plurality of convolutional layers, the optical flow encoder includes a plurality of convolutional layers, the first decoder includes a plurality of convolutional layers, and the sub-decoder includes a first sub-decoder and a second sub-decoder.

In an embodiment, inputting the any image of the reference images and the initial optical flow field into the optical flow optimization model to output the residual field and the displacement field may include:
  performing down-sampling and layering of feature pyramid on the any image of the reference images by using the image encoder to obtain a plurality of image feature maps with different resolutions;
  performing down-sampling and layering of feature pyramid on the initial optical flow field by using the optical flow encoder to obtain a plurality of optical flow field feature maps with different resolutions;
  generating a decoded feature map by using the first decoder based on the plurality of image feature maps with different resolutions and the plurality of optical flow field feature maps with different resolutions;
  calculating the residual field by using the first sub-decoder based on the decoded feature map; and
  calculating the displacement field by using the second sub-decoder based on the decoded feature map.

In an embodiment, generating the decoded feature map by using the first decoder based on the plurality of image feature maps with different resolutions and the plurality of optical flow field feature maps with different resolutions specifically may include:
  generating the decoded feature map by using a formula $X_d^1 = D^1$ concatenate $(X_d^2 + X_{er}^2, X_{ef}^1, X_{ef}^2, X_{ef}^3)) + X_{er}^1$, where the first decoder includes four convolutional layers, D is a convolution operation of a first convolutional layer, $X_d^1$ is the decoded feature map output by the first decoder, concatenate is a channel superposition operation, $X_d^2 = D^2$ (concatenate$(X_d^3 + X_{er}^3, X_{ef}^1, X_{ef}^2, X_{ef}^3)$), $D^2$ is a convolution operation of a second convolutional layer, $X_d^3 = D^3$ (concatenate$(X_d^4 + X_{ef}^1, X_{ef}^2, X_{ef}^3)$), $D^3$ is a convolution operation of a third convolutional layer, $X_d^4 = D^4(X_{ef}^3)$, $D^4$ is a convolution operation of a fourth convolutional layer, $X_{er}^1$, $X_{er}^2$ and $X_{er}^3$ are the plurality of image feature maps with different resolutions output by the image encoder, and $X_{ef}^1$, $X_{ef}^2$ and $X_{ef}^3$ are the plurality of optical flow field feature maps with different resolutions output by the optical flow encoder.

The present disclosure further provides a system for optimizing optical flow for images based on the residual field and the displacement field, including:
  a reference image obtaining module, configured to obtain reference images, the reference images are two adjacent images in an image sequence;

an optical flow estimation module, configured to estimate an initial optical flow field from the reference images by using an optical flow estimation method;

an optical flow optimization model obtaining module, configured to obtain the optical flow optimization model, where the optical flow optimization model includes an image encoder, an optical flow encoder, a first decoder, and a sub-decoder;

a residual field and displacement field calculation module, configured to input any image of the reference images and the initial optical flow field into the optical flow optimization model to output the residual field and the displacement field;

a superposition module, configured to superimpose the initial optical flow field and the residual field to obtain a preliminarily optimized optical flow field; and a resampling module, configured to resample the preliminarily optimized optical flow field by using the displacement field to obtain an optimized optical flow field.

In an embodiment, the image encoder includes a plurality of convolutional layers, the optical flow encoder includes a plurality of convolutional layers, the first decoder includes a plurality of convolutional layers, and the sub-decoder includes a first sub-decoder and a second sub-decoder.

In an embodiment, the residual field and displacement field calculation module specifically may include:

an image feature extraction unit, configured to perform down-sampling and layering of feature pyramid on the any image of the reference images by using the image encoder to obtain a plurality of image feature maps with different resolutions;

an optical flow field feature extraction unit, configured to perform down-sampling and layering of feature pyramid on the initial optical flow field by using the optical flow encoder to obtain a plurality of optical flow field feature maps with different resolutions;

a first decoding unit, configured to generate a decoded feature map by using the first decoder based on the plurality of image feature maps with different resolutions and the plurality of optical flow field feature maps with different resolutions;

a residual field calculation unit, configured to calculate the residual field by using the first sub-decoder based on the decoded feature map; and a displacement field calculation unit, configured to calculate the displacement field by using the second sub-decoder based on the decoded feature map.

In an embodiment, the first decoding unit may include:

a decoding subunit, configured to generate the decoded feature map by using a formula $X_d^1=D^1$ (concatenate $(X_d^2+X_{er}^2, X_{ef}^1, X_{ef}^2, X_{ef}^3))$, $+X_{er}^1$, where the first decoder includes four convolutional layers, $D^1$ is a convolution operation of a first convolutional layer, $X_d^1$ is the decoded feature map output by the first decoder, concatenate is a channel superposition operation, $X_d^2=D^2$ (concatenate$(X_d^3+X_{er}^3, X_{ef}^1, X_{ef}^2, X_{ef}^3))$, $D^2$ is a convolution operation of a second convolutional layer, $X_d^3=D^3$, (concatenate$(X_d^4+X_{ef}^1, X_{ef}^2, X_{ef}^3))$ $D^3$ is a convolution operation of a third convolutional layer, $X_d^4=D^4 (X_{ef}^3)$ $D^4$ is a convolution operation of a fourth convolutional layer, $X_{er}^1$, $X_{er}^2$ and $X_{er}^3$ are the plurality of image feature maps with different resolutions output by the image encoder, and $X_{ef}^1$, $X_{ef}^2$ and $X_{ef}^3$ are the plurality of optical flow field feature maps with different resolutions output by the optical flow encoder.

According to specific embodiments provided in the present disclosure, the present disclosure has the following technical effects:

According to the present disclosure, the residual field and the displacement field are used to optimize the optical flow estimation of a motion boundary region. An optimization based on the residual field may achieve better calculation accuracy for the image sequence including non-rigid motion and large displacement, and further optimization based on the displacement field may significantly improve accuracy of an optical flow field at a motion boundary of an object in the image.

BRIEF DESCRIPTION OF THE DRAWINGS

In order to illustrate the embodiments of the present disclosure or the technical solutions of the conventional art more clearly, the accompanying drawing used in the embodiments will be briefly described below. Apparently, the accompanying drawings described below show merely some embodiments of the present disclosure. For those of ordinary skill in the art, other drawings can be obtained according to the accompanying drawings without creative efforts.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are merely a part of the embodiments of the present disclosure, rather than all of the embodiments. All other embodiments obtained by the ordinary skilled in the art based on the embodiments of the present disclosure without creative efforts shall fall within the scope of protection of the present disclosure.

To make the above objectives, features and advantages of the present disclosure clearer and more comprehensible, the present disclosure is described in further detail below in conjunction with the accompanying drawings and specific implementations.

Figure 1:
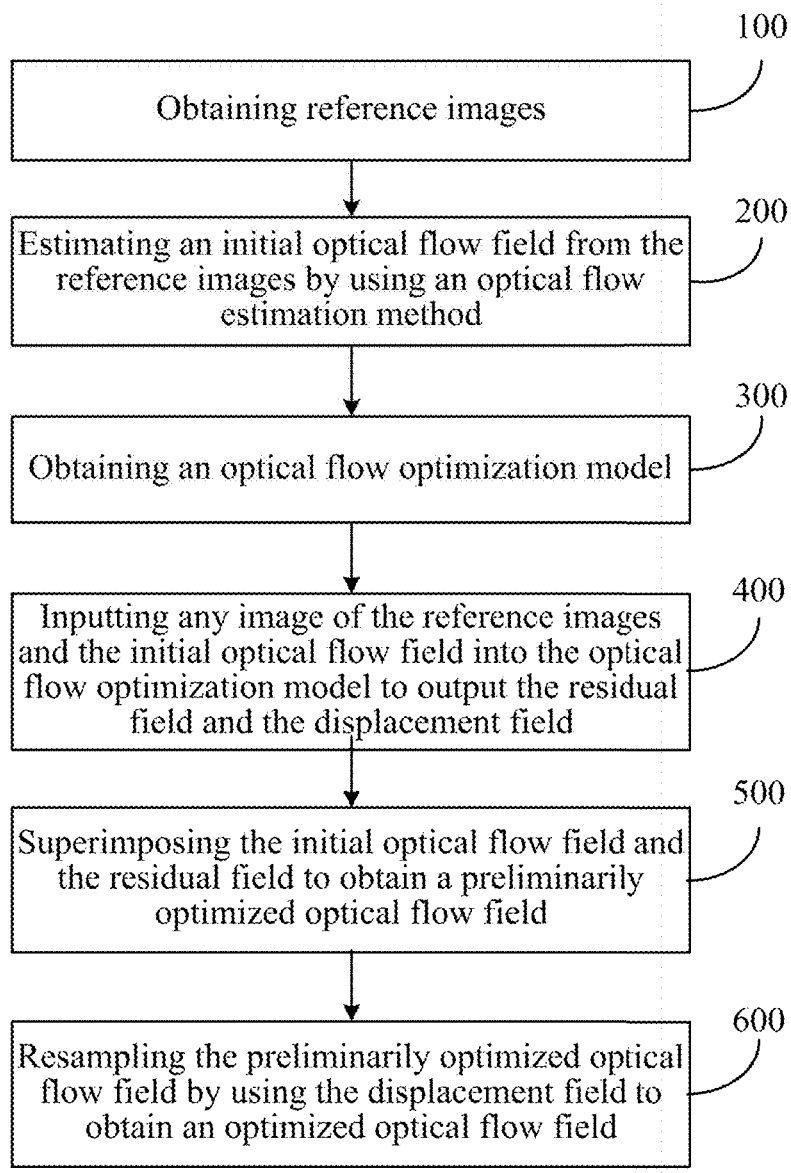
FIG. 1 is a schematic flow chart of a method for optimizing optical flow for images based on a residual field and a displacement field according to the present disclosure.

FIG. 1 is a schematic flow chart of a method for optimizing optical flow for images based on a residual field and a displacement field according to the present disclosure. As shown in FIG. 1, the method for optimizing the optical flow for images based on the residual field and the displacement field according to the present disclosure includes steps 100-600.

Figure 2:
FIG. 2 is an example of a reference image according to the present disclosure.

In step 100, reference images are obtained. The reference images are two adjacent images in an image sequence, and the two adjacent images include first image and a second image. For example, as shown in FIG. 2, FIG. 2 is the first image in an image sequence ambush5.

Figure 3:
FIG. 3 is an initial optical flow field according to the present disclosure.

In step 200, an initial optical flow field is estimated from the reference images by using an optical flow estimation method. A conventional optical flow estimation method is used to estimate an optical flow for the reference images to obtain an estimation result as the initial optical flow field. Based on the first image in the reference images as shown in FIG. 2, the initial optical flow field obtained after the optical flow estimation on the first image and the second image is shown in FIG. 3.

Figure 4:
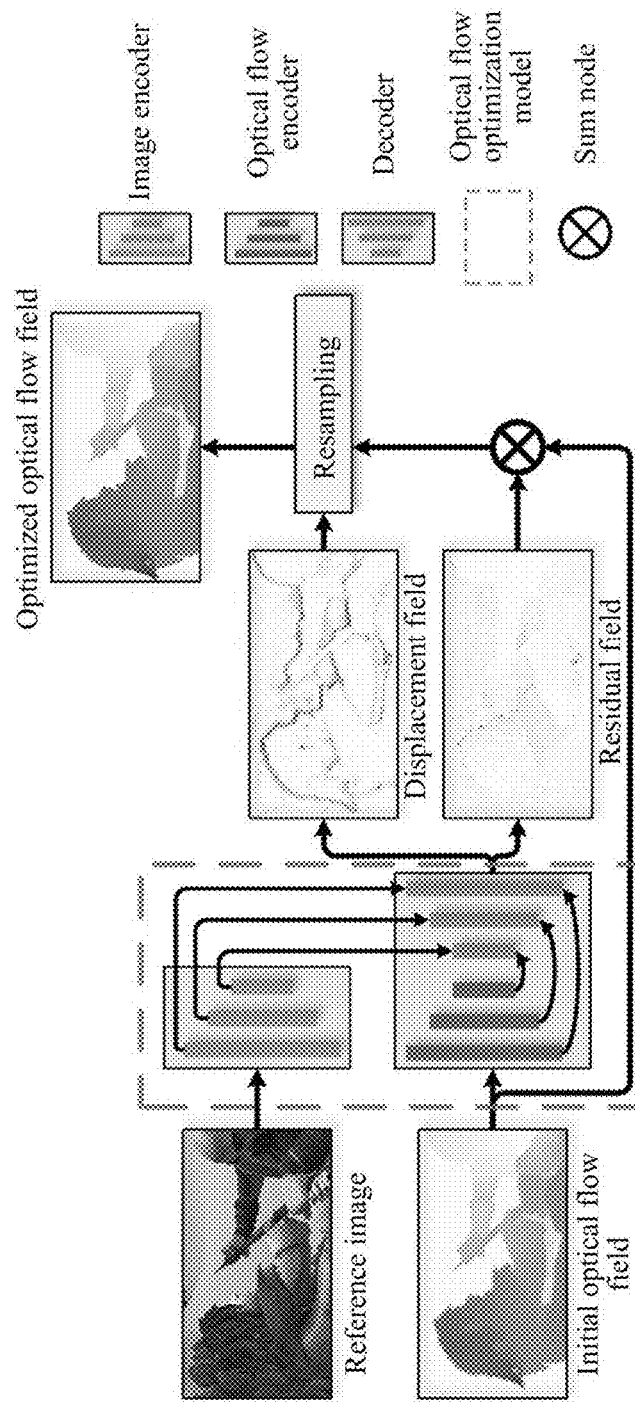
FIG. 4 is an overall diagram of an optical flow optimization model according to the present disclosure.

In step 300, an optical flow optimization model is obtained. As shown in FIG. 4, the optical flow optimization model of the present disclosure may include an image encoder, an optical flow encoder, a first decoder, and a sub-decoder. The image encoder $E_r$ may include three 3×3 convolutional layers $E_r^1$, $E_r^2$ and $E_r^3$, and is used to perform down-sampling and layering of feature pyramid on any image of the reference images to obtain three image feature maps $X_{er}^1$, $X_{er}^2$ and $X_{er}^3$ with different resolutions. A calculation manner is as follows:

$$\begin{cases} X_{er}^1 = E_r^1(I) \\ X_{er}^2 = E_r^2(X_{er}^1) \\ X_{er}^3 = E_r^3(X_{er}^2) \end{cases} \quad (1)$$

Where, $E_r^1(I)$ (is a convolution operation performed by a first convolutional layer $E_r^1$ of the image encoder on any image I of the reference images, to obtain the image feature map $X_{er}^1$ output by the first convolutional layer; $E_r^2(X_{er}^1)$ is a convolution operation performed by a second convolutional layer $E_r^2$ of the image encoder on the image feature map $X_{er}^1$, to obtain the image feature map $X_{er}^2$ output by the second convolutional layer; and $E_r^3(X_{er}^2)$ is a convolution operation performed by a third convolutional layer $E_r^3$ of the image encoder on the image feature map $X_{er}^2$, to obtain the image feature map $X_{er}^3$ output by the third convolutional layer.

The optical flow encoder $E_f$ may include three 3×3 convolutional layers $E_f^1$, $E_f^2$ and $E_f^3$, and is used to perform down-sampling and layering of feature pyramid on a selected initial optical flow field to obtain three optical flow feature maps $X_{ef}^1$, $X_{ef}^2$ and $X_{ef}^3$ with different resolutions. A calculation manner is as follows:

$$\begin{cases} X_{ef}^1 = E_f^1(F_{init}) \\ X_{ef}^2 = E_f^2(X_{ef}^1) \\ X_{ef}^3 = E_f^3(X_{ef}^2) \end{cases} \quad (2)$$

Where, $E_f^1(F_{init})$ is a convolution operation performed by a first convolutional layer $E_f^1$ of the optical flow encoder on the initial optical flow field $F_{init}$, to obtain the optical flow feature map $X_{ef}^1$; $E_f^2(X_{ef}^1)$ is a convolution operation performed by a second convolutional layer $E_f^2$ of the optical flow encoder on the optical flow feature map $X_{ef}^1$, to obtain the optical flow feature map $X_{ef}^2$; and $E_f^3(X_{ef}^2)$ is a convolution operation performed by a third convolutional layer $E_f^3$ of the optical flow encoder on the optical flow feature map $X_{ef}^2$, to obtain the optical flow feature map $X_{ef}^3$.

The first decoder may include four 3×3 convolutional layers $D^1$, $D^2$, $D^3$ and $D^4$ The first decoder receives the feature maps $X_{er}^1$, $X_{er}^2$ and $X_{er}^3$ output by the image encoder and the feature maps $X_{ef}^1$, $X_{ef}^2$ and $X_{ef}^3$ output by the optical flow encoder to obtain a decoded feature map $X_d^1$. A calculation manner is as follows:

$$\begin{cases} X_d^4 = D^4(X_{ef}^3) \\ X_d^3 = D^3(\text{concatenate}(X_d^4, X_{ef}^1, X_{ef}^2, X_{ef}^3)) \\ X_d^2 = D^2(\text{concatenate}(X_d^3 + X_{er}^3, X_{ef}^1, X_{ef}^2, X_{ef}^3)) \\ X_d^1 = D^1(\text{concatenate}(X_d^2 + X_{er}^2, X_{ef}^1, X_{ef}^2, X_{ef}^3)) + X_{er}^1 \end{cases} \quad (3)$$

Where, $D^4(X_{ef}^3)$ is a convolution operation performed by a fourth convolutional layer of the first decoder on the optical flow feature map $X_{ef}^3$, to obtain a feature map $X_d^4$; $D^3$ (concatenate($X_d^4+X_{ef}^1,X_{ef}^2,X_{ef}^3$)) is a convolution operation performed by a third convolutional layer of the first decoder on the feature map $X_d^4$ and the optical flow feature maps, to obtain a feature map $X_d^3$; concatenate is a channel superposition operation; $D^2$ (concatenate ($X_d^3+X_{er}^3,X_{ef}^1,X_{ef}^2,X_{ef}^3$)) is a convolution operation performed by a second convolutional layer of the first decoder on the feature map $X_d^3$, the optical flow feature maps and the image feature map, to obtain a feature map $X_d^2$; and $D^1$ (concatenate ($X_d^2+X_{er}^2,X_{ef}^1,X_{ef}^2,X_{ef}^3$)) is a convolution operation performed by a first convolutional layer of the first decoder on the feature map $X_d^2$, the optical flow feature maps and the image feature map to obtain a convolution result, and the obtained convolution result is superimposed on the image feature map $X_{er}^1$ to obtain the feature map $X_d^1$, that is, the decoded feature map output by the first decoder.

In step 400, any image of the reference images and the initial optical flow field are input into the optical flow optimization model to output the residual field and the displacement field. Any image of the reference images and the initial optical flow field are input into the optical flow optimization model, and as shown in FIG. 4, any image of the reference images and the initial optical flow field sequentially pass through the image encoder, the optical flow encoder and the first decoder to output the decoded feature map. The sub-decoder of the present disclosure may include a first sub-decoder and a second sub-decoder, and both the first sub-decoder and the second sub-decoder are 3×3 convolutional layers. The first sub-decoder is used to calculate the residual field, and the second sub-decoder is used to calculate the displacement field. A formula is as follows:

$$\begin{cases} f_{res} = D_{res}(x_d^1) \\ f_{dis} = D_{dis}(x_d^1) \end{cases} \quad (4)$$

Where, $D_{res}(X_d^1)$ is a convolution operation performed by the first sub-decoder on the decoded feature map $X_d^1$, to obtain the residual field $f_{res}$; and $D_{dis}(X_d^1)$ is a convolution operation performed by the second sub-decoder on the decoded feature map $X_d^1$, to obtain the displacement field $f_{dis}$.

In step 500, the initial optical flow field and the residual field are superimposed to obtain a preliminarily optimized optical flow field. A formula is as follows:

$$\forall p \in I, F_{init+res}(p) = F_{init}(p) + f_{res}(p) \quad (5)$$

Where, P is a coordinate position of a pixel in any image I of the reference images, $F_{init}(p)$ is an optical flow value at a coordinate point P in the optical flow field, $f_{res}(p)$ is an initial residual at the coordinate point P in an image coordinate system, and $F_{init+res}(p)$ is a result by superimposing an initial optical flow value and a residual at the coordinate point P, that is, a preliminarily optimized optical flow value at the coordinate point P.

In step 600, the preliminarily optimized optical flow field is resampled by using the displacement field to obtain an optimized optical flow field. A formula is as follows:

$$\forall p \in I, f_{refined}(p) = F_{init+res}(p + f_{dis}(p)) \quad (6)$$

Figure 5:
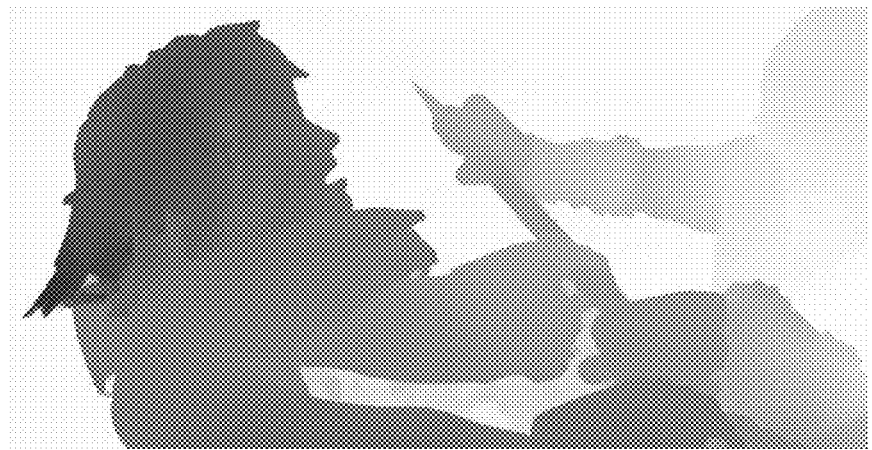
FIG. 5 is an optical flow field optimized by the optical flow optimization model according to the present disclosure.

Where, $f_{refined}(P)$ is the optimized optical flow field obtained after the optical flow field is resampled according to a required pixel coordinate position $P + f_{dis}(p)$. The optimized optical flow field is shown in FIG. 5.

The following example illustrates a resampling process. Assuming that the optical flow at a coordinate point $p=(10,5)$ before resampling in an optical flow field $f_{old}$ is $f_{old}(p)=(3,2)$, and the displacement field of this coordinate point is $f_{dis}(p)=(2,-1)$ a value of an optical flow $f_{new}(p)$ at the coordinate point $p=(10,5)$ of an optical flow field $f_{new}$ is calculated from an optical flow $$f_{old}(p + f_{dis}(p)) = f_{old}((10, 5) + (2, -1)) = f_{old}(12, 4)$$

at a coordinate point $p+f_{dis}(p)=(10+2,5-1)=(12,4)$. A calculation manner is:

$$f_{new}(p) = f_{old}(p + f_{dis}(p)) = f_{old}(12,4).$$

Figure 6:
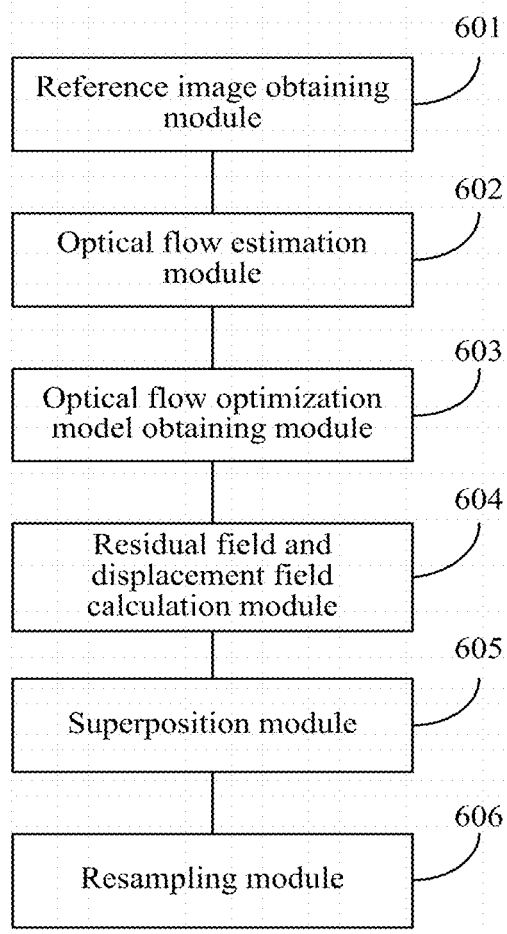
FIG. 6 is a schematic structural diagram of a system for optimizing optical flow for images based on the residual field and the displacement field according to the present disclosure.

The present disclosure also provides a system for optimizing the optical flow for the images based on the residual field and the displacement field. FIG. 6 is a schematic structural diagram of the system for optimizing the optical flow for the images based on the residual field and the displacement field according to the present disclosure. As shown in FIG. 6, the system for optimizing the optical flow for the images based on the residual field and the displacement field according to the present disclosure includes a reference image obtaining module 601, an optical flow estimation module 602, an optical flow optimization model obtaining module 603, a residual field and displacement field calculation module 604, a superposition module 605 and a resampling module 606.

The reference image obtaining module 601 is configured to obtain reference images, the reference images are two adjacent images in an image sequence.

The optical flow estimation module 602 is configured to estimate an initial optical flow field from the reference images by using an optical flow estimation method.

The optical flow optimization model obtaining module 603 is configured to obtain the optical flow optimization model, where the optical flow optimization model includes an image encoder, an optical flow encoder, a first decoder, and a sub-decoder.

The residual field and displacement field calculation module 604 is configured to input any image of the reference images and the initial optical flow field into the optical flow optimization model to output the residual field and the displacement field.

The superposition module 605 is configured to superimpose the initial optical flow field and the residual field to obtain a preliminarily optimized optical flow field.

The resampling module 606 is configured to resample the preliminarily optimized optical flow field by using the displacement field to obtain an optimized optical flow field.

As a specific embodiment, in the system for optimizing the optical flow for the images based on the residual field and the displacement field according to the present disclosure, the image encoder includes a plurality of convolutional layers, the optical flow encoder includes a plurality of convolutional layers, the first decoder includes a plurality of convolutional layers, and the sub-decoder includes a first sub-decoder and a second sub-decoder.

As a specific embodiment, in the system for optimizing the optical flow for the images based on the residual field and the displacement field according to the present disclosure, the residual field and displacement field calculation module 604 may include an image feature extraction unit, an optical flow field feature extraction unit, a first decoding unit, a residual field calculation unit, and a displacement field calculation unit.

The image feature extraction unit is configured to perform down-sampling and layering of feature pyramid on the any image of the reference images by using the image encoder to obtain a plurality of image feature maps with different resolutions.

The optical flow field feature extraction unit is configured to perform down-sampling and layering of feature pyramid on the initial optical flow field by using the optical flow encoder to obtain a plurality of optical flow field feature maps with different resolutions.

The first decoding unit is configured to generate a decoded feature map by using the first decoder based on the plurality of image feature maps with different resolutions and the plurality of optical flow field feature maps with different resolutions.

The residual field calculation unit is configured to calculate the residual field by using the first sub-decoder based on the decoded feature map.

The displacement field calculation unit is configured to calculate the displacement field by using the second sub-decoder based on the decoded feature map.

As a specific embodiment, in the system for optimizing the optical flow for the images based on the residual field and the displacement field according to the present disclosure, the first decoding unit may include a decoding subunit.

The decoding subunit is configured to generate the decoded feature map by using a formula $X_d^1 = D^1$ (concatenate($X_d^2 + X_{er}^2, X_{ef}^1, X_{ef}^2, X_{ef}^3$)) $+ X_{er}^1 d$, where the first decoder includes four convolutional layers, $D^1$ is a convolution operation of a first convolutional layer, $X_d^1$ is the decoded feature map output by the first decoder, concatenate is a channel superposition operation; $X_d^2 = D^2$ (concatenate ($X_d^3 + X_{er}^3, X_{ef}^1, X_{ef}^2, X_{ef}^3$)), and $D^2$ is a convolution operation of a second convolutional layer; $X_d^3 = D^3$ (concatenate ($X_d^4 + X_{ef}^1, X_{ef}^2, X_{ef}^3$)) and $D^3$ is a convolution operation of a third convolutional layer; $X_d^4 = D^4(X_{ef}^3)$, and $D^4$ is a convolution operation of a fourth convolutional layer, $X_{er}^1$, $X_{er}^2$ and $X_{er}^3$ are the plurality of image feature maps with different resolutions output by the image encoder, and $X_{ef}^1$, $X_{ef}^2$ and $X_{ef}^3$ are the plurality of optical flow field feature maps with different resolutions output by the optical flow encoder.

Various embodiments of the present specification are described in a progressive manner, each embodiment focuses on the difference from other embodiments, and the same and similar parts between the various embodiments may refer to with each other. For the system disclosed in the embodiments, since the system corresponds to the method disclosed in the embodiments, the description is relatively simple, and reference can be made to the method description.

In this specification, several specific examples are used for illustration of the principles and implementations of the present disclosure. The descriptions of the foregoing embodiments are used to help understand the method of the present disclosure and the core ideas thereof. In addition, for those of ordinary skill in the art, there will be changes in the specific implementations and the scope of application in accordance with the ideas of the present disclosure. In conclusion, the content of this specification shall not be construed as a limitation to the present disclosure.

What is claimed is:

1. A method for optimizing optical flow for images based on a residual field and a displacement field, comprising:
    obtaining reference images, the reference images are two adjacent images in an image sequence;
    estimating an initial optical flow field from the reference images by using an optical flow estimation method;
    obtaining an optical flow optimization model, wherein the optical flow optimization model comprises an image encoder, an optical flow encoder, a first decoder, and a sub-decoder;
    inputting any image of the reference images and the initial optical flow field into the optical flow optimization model to output the residual field and the displacement field;
    superimposing the initial optical flow field and the residual field to obtain a preliminarily optimized optical flow field; and
    resampling the preliminarily optimized optical flow field by using the displacement field to obtain an optimized optical flow field.

2. The method for optimizing the optical flow for the images based on the residual field and the displacement field according to claim 1, wherein the image encoder comprises a plurality of convolutional layers, the optical flow encoder comprises a plurality of convolutional layers, the first decoder comprises a plurality of convolutional layers, and the sub-decoder comprises a first sub-decoder and a second sub-decoder.

3. The method for optimizing the optical flow for the images based on the residual field and the displacement field according to claim 2, wherein inputting the any image of the reference images and the initial optical flow field into the optical flow optimization model to output the residual field and the displacement field comprises:
    performing down-sampling and layering of feature pyramid on the any image of the reference images by using the image encoder to obtain a plurality of image feature maps with different resolutions;
    performing down-sampling and layering of feature pyramid on the initial optical flow field by using the optical flow encoder to obtain a plurality of optical flow field feature maps with different resolutions;
    generating a decoded feature map by using the first decoder based on the plurality of image feature maps with different resolutions and the plurality of optical flow field feature maps with different resolutions;
    calculating the residual field by using the first sub-decoder based on the decoded feature map; and
    calculating the displacement field by using the second sub-decoder based on the decoded feature map.

4. The method for optimizing the optical flow for the images based on the residual field and the displacement field according to claim 3, wherein generating the decoded feature map by using the first decoder based on the plurality of image feature maps with different resolutions and the plurality of optical flow field feature maps with different resolutions comprises:
    generating the decoded feature map by using a formula $X_d^1 = D^1$ (concatenate($X_d^2 + X_{er}^2, X_{ef}^1, X_{ef}^2, X_{ef}^3$)) $+ X_{er}^1$, wherein the first decoder comprises four convolutional layers, $D^1$ is a convolution operation of a first convolutional layer, $X_d^1$ is the decoded feature map output by the first decoder, concatenate is a channel superposition operation, $X_d^2 = D^2$ ((concatenate($X_d^3 + X_{er}^3, X_{ef}^1, X_{ef}^2, X_{ef}^3$)), $D^2$ is a convolution operation of a second convolutional layer, $X_d^3 = D^3$ (concatenate($X_d^4 + X_{ef}^1, X_{ef}^2, X_{ef}^3$)), $D^3$ is a convolution operation of a third convolutional layer, $X_d^4 = D^4(X_{ef}^3)$, $D^4$ is a convolution operation of a fourth convolutional layer, $X_{er}^1$, $X_{er}^2$ and $X_{er}^3$ are the plurality of image feature maps with different resolutions output by the image encoder, and $X_{ef}^1$, $X_{ef}^2$, and $X_{ef}^3$ are the plurality of optical flow field feature maps with different resolutions output by the optical flow encoder.

5. A system for optimizing optical flow for images based on a residual field and a displacement field, comprising:
    a reference image obtaining module, configured to obtain reference images, the reference images are two adjacent images in an image sequence;
    an optical flow estimation module, configured to estimate an initial optical flow field from the reference images by using an optical flow estimation method;
    an optical flow optimization model obtaining module, configured to obtain the optical flow optimization model, wherein the optical flow optimization model comprises an image encoder, an optical flow encoder, a first decoder, and a sub-decoder;
    a residual field and displacement field calculation module, configured to input any image of the reference images and the initial optical flow field into the optical flow optimization model to output the residual field and the displacement field;
    a superposition module, configured to superimpose the initial optical flow field and the residual field to obtain a preliminarily optimized optical flow field; and
    a resampling module, configured to resample the preliminarily optimized optical flow field by using the displacement field to obtain an optimized optical flow field.

6. The system for optimizing the optical flow for the images based on the residual field and the displacement field according to claim 5, wherein the image encoder comprises a plurality of convolutional layers, the optical flow encoder comprises a plurality of convolutional layers, the first decoder comprises a plurality of convolutional layers, and the sub-decoder comprises a first sub-decoder and a second sub-decoder.

7. The system for optimizing the optical flow for the images based on the residual field and the displacement field according to claim 6, wherein the residual field and displacement field calculation module comprises:
    an image feature extraction unit, configured to perform down-sampling and layering of feature pyramid on the any image of the reference images by using the image encoder to obtain a plurality of image feature maps with different resolutions;
    an optical flow field feature extraction unit, configured to perform down-sampling and layering of feature pyramid on the initial optical flow field by using the optical flow encoder to obtain a plurality of optical flow field feature maps with different resolutions;

a first decoding unit, configured to generate a decoded feature map by using the first decoder based on the plurality of image feature maps with different resolutions and the plurality of optical flow field feature maps with different resolutions;

a residual field calculation unit, configured to calculate the residual field by using the first sub-decoder based on the decoded feature map; and a displacement field calculation unit, configured to calculate the displacement field by using the second sub-decoder based on the decoded feature map.

8. The system for optimizing the optical flow for the images based on the residual field and the displacement field according to claim 7, wherein the first decoding unit comprises:

a decoding subunit, configured to generate the decoded feature map by using a formula $X_d^1 = D^1$ (concatenate $(X_d^2 + X_{er}^2, X_{ef}^1, X_{ef}^2, X_{ef}^3)) + X_{er}^1$, wherein the first decoder comprises four convolutional layers, $D^1$ is a convolution operation of a first convolutional layer, $X_d^1$ is the decoded feature map output by the first decoder, concatenate is a channel superposition operation, $X_d^2 = D^2$ (concatenate$(X_d^3 + X_{er}^3, X_{ef}^1, X_{ef}^2, X_{ef}^3))$, $D^2$ is a convolution operation of a second convolutional layer, $X_d^3 = D^3$ (concatenate$(X_d^4 + X_{ef}^1, X_{ef}^2, X_{ef}^3))$ $D^3$ is a convolution operation of a third convolutional layer, $X_d^4 = D^4(X_{ef}^3)$, $D^4$ is a convolution operation of a fourth convolutional layer, $X_{er}^1$, $X_{er}^2$ and $X_{er}^3$ are the plurality of image feature maps with different resolutions output by the image encoder, $X_{ef}^1$, $X_{ef}^2$ and $X_{ef}^3$ are the plurality of optical flow field feature maps with different resolutions output by the optical flow encoder.

* * * * *